(12) United States Patent
Carson et al.

(10) Patent No.: US 8,360,124 B2
(45) Date of Patent: Jan. 29, 2013

(54) APPARATUS AND PROCESS FOR IN-MOLD LABELING

(75) Inventors: David E. Carson, Fort Collins, CO (US); Matthew C. Davis, Fort Collins, CO (US); Thomas A. Sahrle, Fort Collins, CO (US); Geoffrey S. White, Fort Collins, CO (US); Robert J. Wooden, Fort Collins, CO (US)

(73) Assignee: CBW Automation, Inc., Fort Collins, CO (US)

( * ) Notice: Subject to any disclaimer, the term of this patent is extended or adjusted under 35 U.S.C. 154(b) by 371 days.

(21) Appl. No.: 12/802,417

(22) Filed: Jun. 7, 2010

(65) Prior Publication Data
US 2011/0297293 A1   Dec. 8, 2011

(51) Int. Cl.
*B32B 41/00* (2006.01)
(52) U.S. Cl. .......... 156/350; 156/64; 156/245; 156/250; 156/256; 156/353; 156/362; 156/363; 156/364; 156/378; 156/379; 156/510; 156/517; 156/527
(58) Field of Classification Search ............ 156/64, 156/245, 250, 256, 350, 353, 362, 363, 364, 156/378, 379, 510, 517, 527
See application file for complete search history.

(56) References Cited

U.S. PATENT DOCUMENTS

| | | |
|---|---|---|
| 5,286,317 A | 2/1994 | Treat et al. |
| 5,344,305 A | 9/1994 | McKillip |
| 5,711,839 A | 1/1998 | Dronzek, Jr. |
| 5,908,590 A | 6/1999 | Yoshimi et al. |
| 5,919,414 A | 7/1999 | Dobler |
| 5,943,957 A | 8/1999 | Mason |
| 6,183,238 B1 | 2/2001 | Dunlap et al. |
| 6,186,767 B1 | 2/2001 | Dunlap et al. |
| 6,422,605 B1 | 7/2002 | Lind |
| 6,508,902 B2 | 1/2003 | Lind |
| 6,991,261 B2 | 1/2006 | Dronzek, Jr. et al. |

*Primary Examiner* — Katarzyna Wyrozebski Lee
*Assistant Examiner* — Joshel Rivera
(74) *Attorney, Agent, or Firm* — William E. Hein

(57) ABSTRACT

An apparatus and process for use in an in-mold labeling application utilizes a rolled label sheet having a multiplicity of pre-printed non-adhesive labels and a pre-printed registration mark associated with each of the labels, a sensor for detecting each of the registration marks to enable alignment of the label sheet in a predetermined longitudinal position before labels are cut therefrom; a set of driven pinch rolls for moving it forward or backward; a circumferential die cutter for cutting one or more labels from the label sheet; a passive float roll following the die cutter for creating a controlled loop in the label sheet that permits the die cutter to operate independently of a vacuum conveyor that follows the float roll, the vacuum conveyor including a sensor to detect each of the registration marks for enabling alignment of the label sheet in a position of registration thereon; and a plurality of vacuum plenums along the vacuum conveyor for selectively receiving hold down vacuum from an external source for maintaining the label sheet in its position of registration during conveyance to a predetermined label removal position, the hold down vacuum then being released to permit removal, by an external pick and place device, of one or more of the previously-cut labels.

14 Claims, 6 Drawing Sheets

APPARATUS AND PROCESS FOR IN-MOLD LABELING

BACKGROUND AND SUMMARY OF THE INVENTION

This invention relates generally to in-mold labeling of plastic containers and, more particularly, to an apparatus and process that cuts non-adhesive labels from a pre-printed roll of label stock more efficiently and that then accurately positions the cut labels on a vacuum conveyor for further processing by conventional pick and place machinery employed in plastic molding processes.

Various in-mold labeling techniques are known in which a label is cut from a roll of label stock and then placed within the cavity of a mold and in which the label becomes adhered to the surface of an article formed within the mold.

U.S. Pat. No. 5,286,317 to Treat et al. describes a mechanism for rotary die cutting labels from a carrier web that is continuously or intermittently moving. An eye mark is provided on the web in association with each of the labels for control purposes while the web is being pulled continuously through the die cutting station by means of driven pinch rolls positioned downstream from the die cutting station.

U.S. Pat. No. 5,344,305 to McKillip describes an apparatus for in-mold labeling in which labels are individually cut from a continuous web as demanded by the cycling of a mold and in which a transfer device picks a freshly cut label from a flat bed or rotary die cutter and places the label within the cavity of a mold located in proximity to the die cutter.

U.S. Pat. No. 5,711,839 to Dronzek, Jr. describes a process for the production of in-line gravure-printed in-mold labeled blow molded containers in which polymeric sheets or rolls are reverse gravure-printed and gravure overcoated on the container-facing side with a heat activatable adhesive and gravure coated on the opposite side with an antistatic coating.

U.S. Pat. No. 5,908,599 to Yoshimi et al. describes a process and apparatus for press punching an adhesive label from a sheet or roll of labels and molding a foamed resin container with the label properly positioned thereon.

U.S. Pat. No. 5,919,414 to Dobler describes a label inserting method and apparatus.

U.S. Pat. No. 5,943,957 to Mason describes a method and apparatus for pad printing inked images onto injection-molded pieces, while they are still in the mold, using a robotics device and an ink transfer mechanism.

U.S. Pat. No. 6,183,238 to Dunlap et al. describes an in-mold labeling system for use with a rotary blow molding machine.

U.S. Pat. No. 6,186,767 to Dunlap et al. describes a label dispensing head for use in a plastic blow molding in-mold labeling system.

U.S. Pat. Nos. 6,422,605 and 6,508,902 to Lind describe an in-mold expanded content label having multiple layers and a heat-activated adhesive, the expanded content label being intended for use in an in-mold labeling process.

U.S. Pat. No. 6,991,261 to Dronzek, Jr. et al. describes labels having a permanent section and a removable coupon section for in-mold production of in-mold labeled molded containers.

The foregoing representative prior art machines and processes variously suffer high label cost, production inefficiencies, and inaccuracies, for example.

An apparatus and process for use in an in-mold labeling application is provided in accordance with the illustrated preferred embodiment of the present invention. The apparatus utilizes a label stock roll containing a multiplicity of pre-printed labels and a pre-printed registration mark associated with each of the labels; a plurality of float rolls and idler rolls that serve to define the path of the label sheet wound on the stock roll before labels are cut therefrom and to maintain a constant tension in the label sheet as it is being unwound, a plurality of sensors along the path to detect the presence of a splice in the label sheet, to detect and laterally justify print patterns on the label sheet, and to detect each of the registration marks on the label sheet for the purpose of aligning the label sheet in a predetermined longitudinal position before labels are cut therefrom; a set of driven pinch rolls for clamping the free end of the label sheet and for longitudinally moving it in a selected direction; a circumferential die cutter for receiving the free end of the label sheet from the pinch rolls and for cutting one or more labels or sets of labels from the label sheet; a passive float roll positioned proximate the output end of the die cutter, the float roll being subjected to a downward force sufficient to create a controlled loop in the label sheet for maintaining a constant tension therein as it exits the die cutter and for permitting the die cutter to operate independently of a vacuum conveyor positioned to receive the label sheet from the float roll; a sensor positioned adjacent the input end of the vacuum conveyor for detecting each of the registration marks for enabling alignment of the label sheet in a predetermined longitudinal position of registration on the vacuum conveyor; a plurality of vacuum plenums provided along the vacuum conveyor, a hold-down vacuum being selectively applied to the vacuum plenums from an external source for maintaining the label sheet in its position of registration on the vacuum conveyor during conveyance to a predetermined label removal position, the hold-down vacuum then being released to permit removal, by an external pick and place device, of one or more of the labels previously cut by said die cutter. One or more scrim hold down assemblies may be mounted along the vacuum conveyor above the label sheet, each of the scrim hold down assemblies being vertically movable between an up position in which it is raised a sufficient distance above the label sheet to permit it to be freely longitudinally conveyed on the vacuum conveyor and a down position in which it contacts the scrim area of the label sheet to permit removal of one or more of the labels previously cut by the die cutter without disturbing the scrim area.

DESCRIPTION OF THE PREFERRED EMBODIMENT

Figure 1:
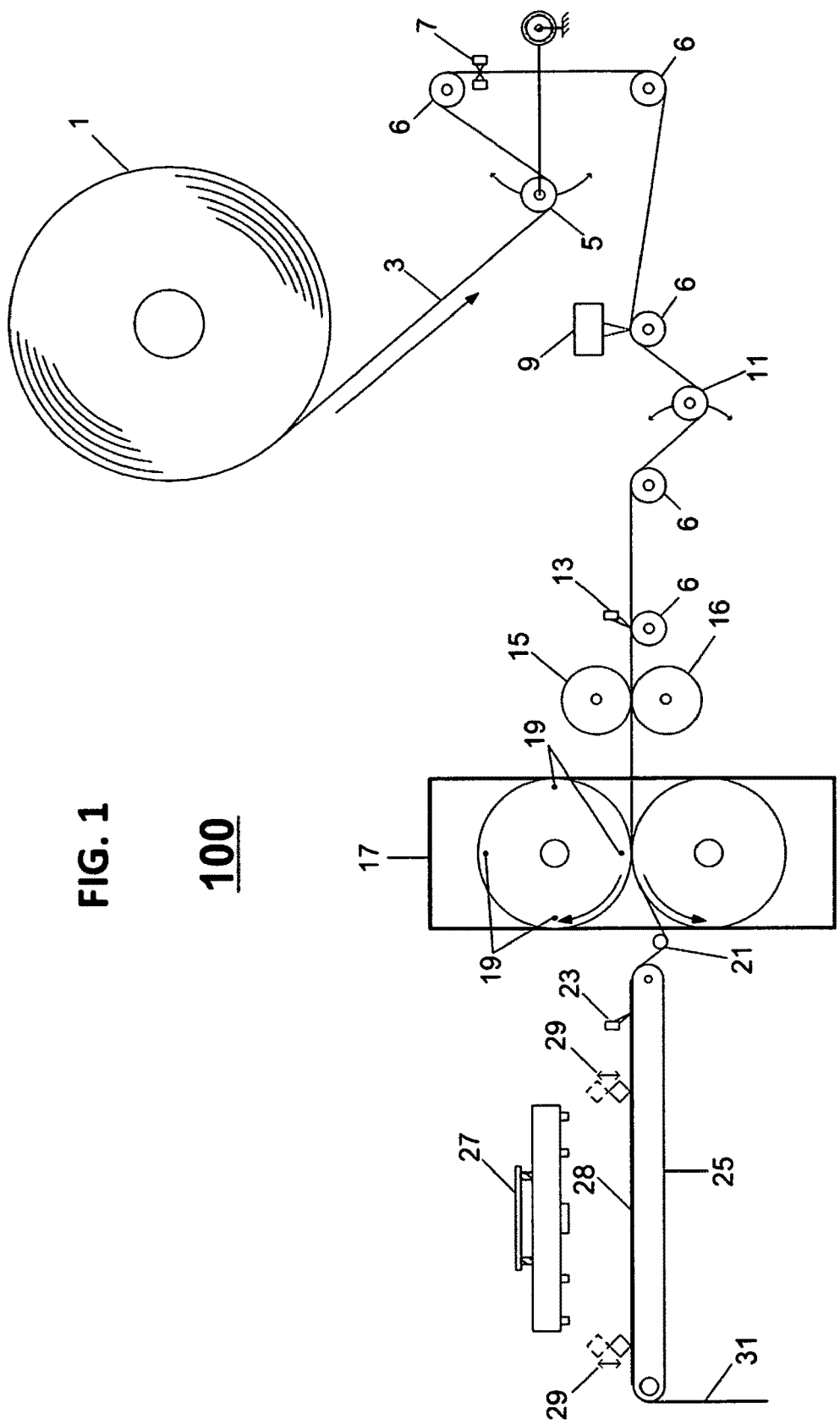
FIG. 1 is a schematic representation of the in-mold labeling apparatus of the present invention.
Figure 2:
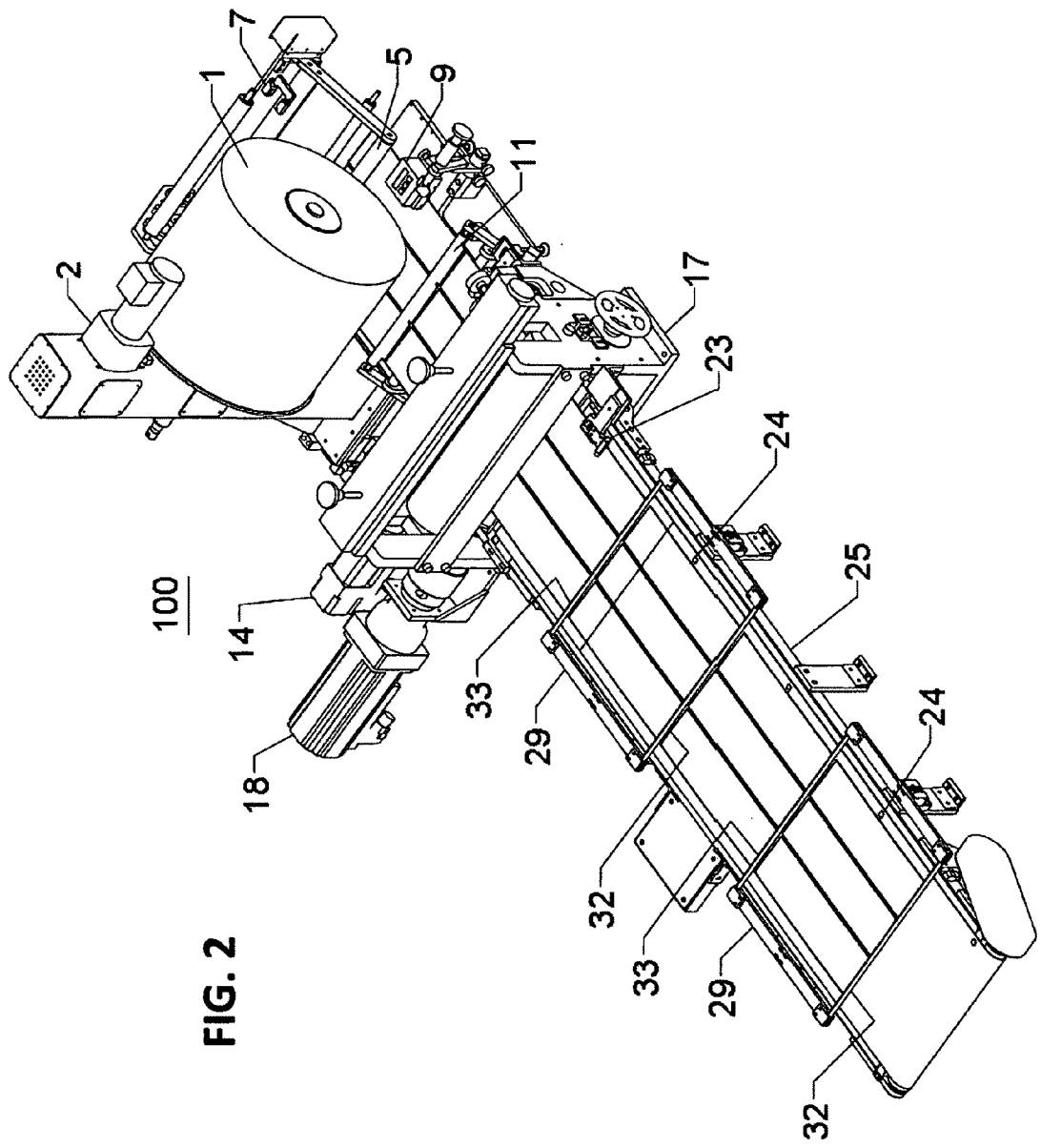
FIG. 2 is a detailed pictorial diagram of the in-mold labeling apparatus of FIG. 1.
Figure 3:
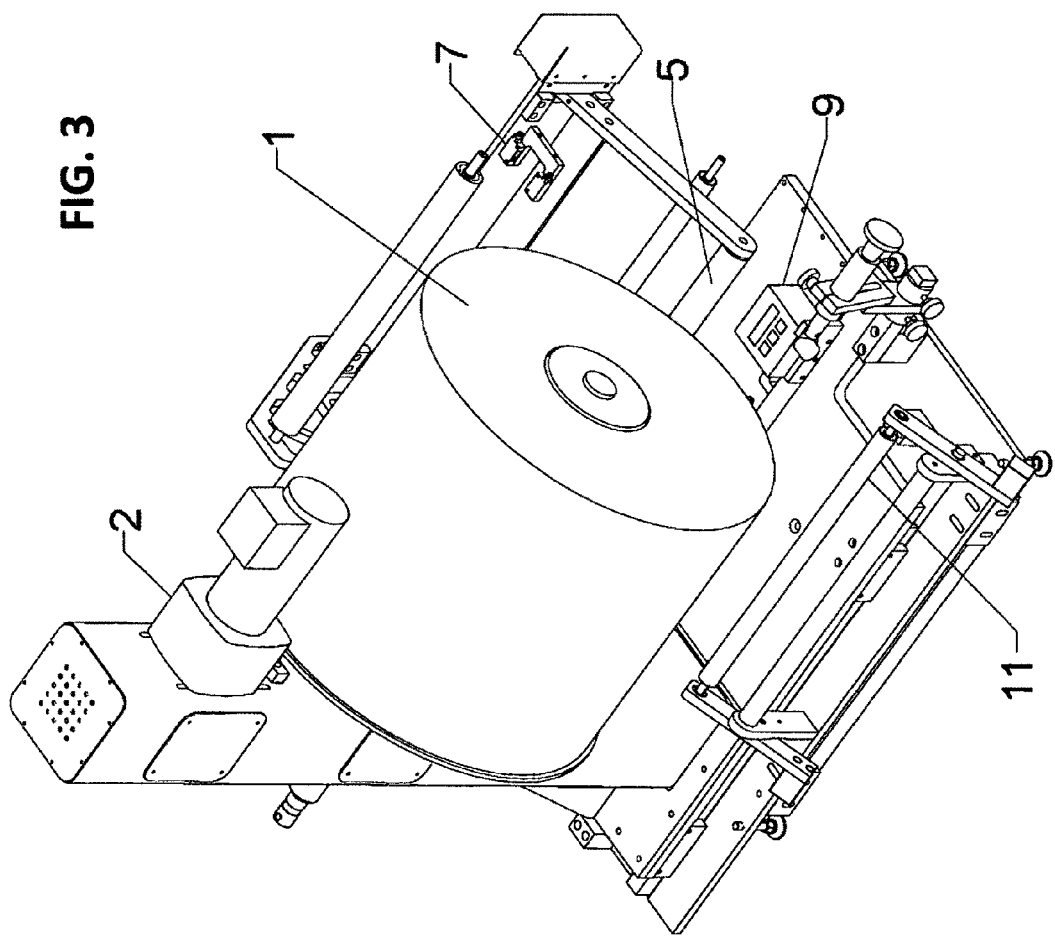
FIG. 3 is a detailed pictorial diagram illustrating the sheet unwinding and lateral justification sections of the in-mold labeling apparatus of FIGS. 1 and 2.
Figure 4:
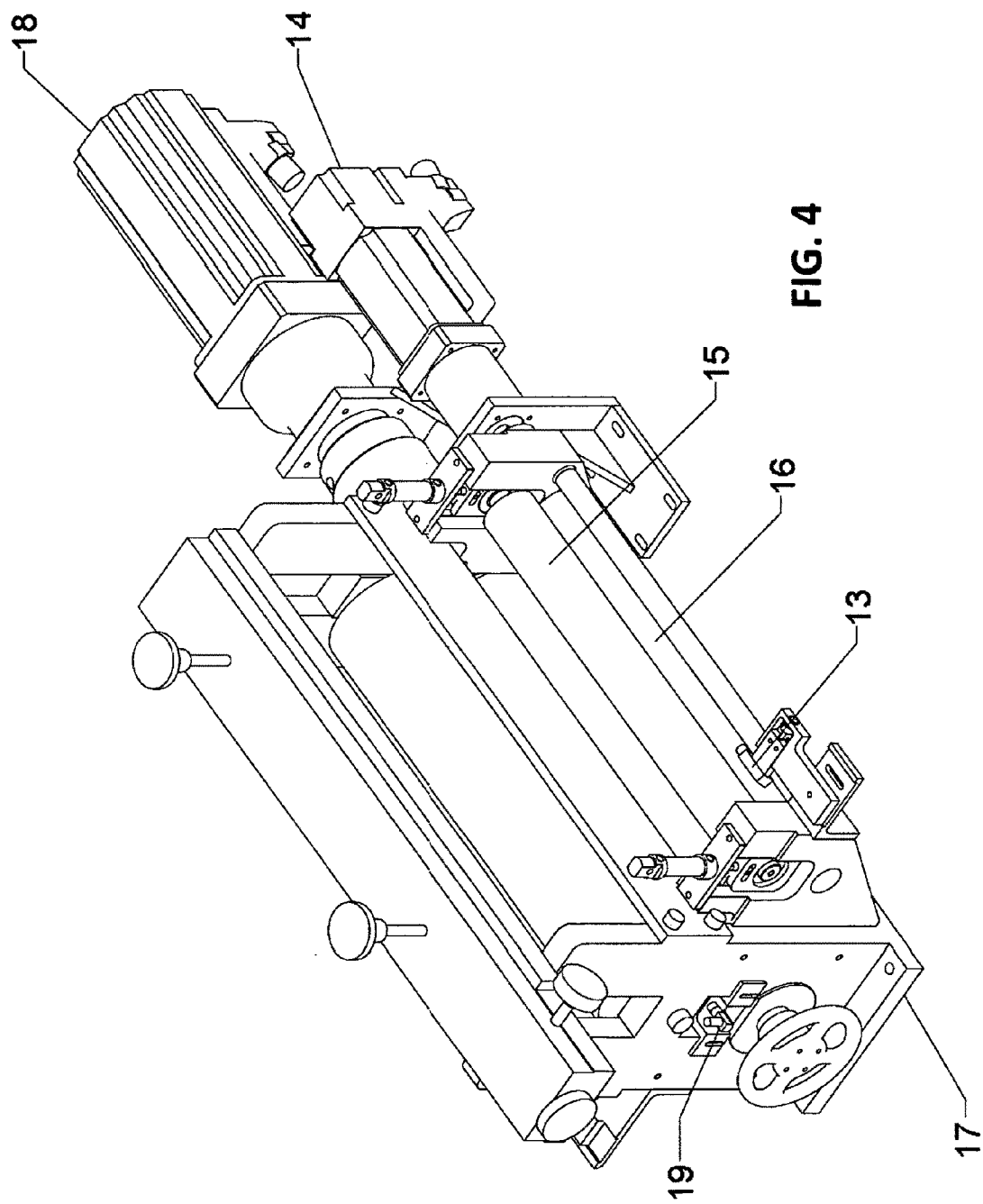
FIG. 4 is a detailed pictorial diagram illustrating the pinch roll and circumferential die cutter sections of the in-mold labeling apparatus of FIGS. 1 and 2.
Figure 5:
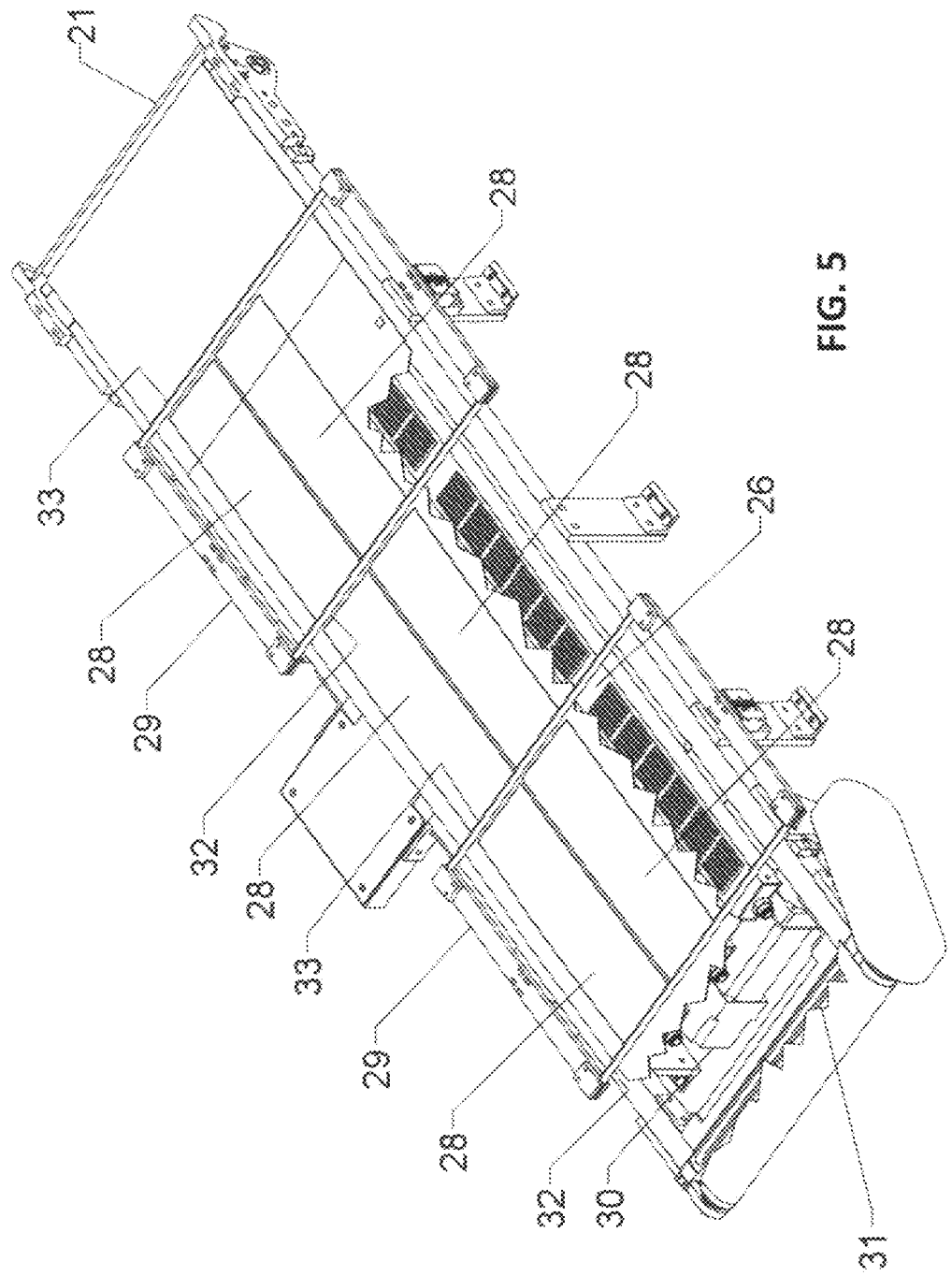
FIG. 5 is a detailed pictorial diagram illustrating the servo-driven vacuum conveyor section of the in-mold labeling apparatus of FIGS. 1 and 2.

Referring now generally to FIGS. 1 and 2 and, for the details thereof, to FIGS. 3-5, there is shown an in-mold labeling apparatus 100 in accordance with the present invention that includes a label stock roll 1 containing a continuous label sheet 3 having one or more longitudinal lanes of non-adhesive labels or sets of labels 28 conventionally pre-printed thereon at predetermined intervals. A position or registration mark 24 is also pre-printed in association with each one of the labels or sets of labels 28. Label sheet 3 is unwound from stock roll 1 by means of a conventional servo motor 2, the free end being routed around a series of rolls, the first of which is an active float roll 5 that serves as the primary device for maintaining constant tension in the label sheet 3 and that also serves to provide feedback for controlling the speed of motor 2. A plurality of rolls 6 serve as idler rolls. Label sheet 3 passes an optical sensor 7 positioned adjacent one of rolls 6 that is capable of detecting a splice in label sheet 3 to enable the in-mold labeling apparatus 100 to respond to detection of a splice in a chosen manner that prevents interruption of the flow of cut labels at the output thereof. An optical sensor 9, positioned downstream from optical sensor 7 adjacent another one of rolls 6, serves to resolve a distinguishing feature, such as a pattern or print, on the label sheet 3 in order to laterally justify those patterns or print to a circumferential die cutter 17, illustrated in FIGS. 1, 3, and 5. Label sheet 3 then passes beneath a passive float roll 11 which serves as a secondary means for maintaining constant tension in label sheet 3. A sensor 13, positioned adjacent another one of rolls 6, serves to detect registration mark 24 for the purpose of aligning label sheet 3 in a predetermined position longitudinally with respect to circumferential die cutter 17.

Downstream from sensor 13, label sheet 3 is routed between a set of pinch rolls 15, 16 driven by a servo motor 14. Rolls 15, 16 impart a sufficient clamping force to convey label sheet 3 through circumferential die cutter 17. Circumferential die cutter 17 is rotationally driven by a servo motor 18 in a precisely controlled manner to cut each of the labels or sets of labels 28 from label sheet 3. Each of the labels or sets of labels 28 may be completely cut by circumferential die cutter 17 from label sheet 3, or they may be partially cut therefrom, leaving a plurality of tabs that connect various points along the peripheral edge of the labels or sets of labels 28 to the waste portion of label sheet 3, commonly known in the industry as the scrim. Rotation of circumferential die cutter 17 is stopped after a partial or complete revolution thereof, as detected by one or more calibration sensors 19 on circumferential die cutter 17.

A vacuum conveyor 25 is driven by a servo motor 30 and is horizontally positioned to receive label sheet 3, with labels or sets of labels 28 completely or partially cut therefrom, at the output of circumferential die cutter 17. Before entering vacuum conveyor 25, label sheet 3 is routed beneath a passive float roll 21 that is positioned between circumferential die cutter 17 and the input end of vacuum conveyor 25. A downward force applied to passive float roll 21 serves to create a controlled loop in label sheet 3 for maintaining a desired tension therein as it exits circumferential die cutter 17. This downward force may be produced by the weight of passive float roll 21 itself or by a conventional spring tensioning device, for example. The loop produced in label sheet 3 by float roll 21 permits the vacuum conveyor 25 and the circumferential die cutter 17 to operate independently of each other, thus allowing each of them to re-register for the next label cutting cycle without subjecting label sheet 3 to excessive tension that may result in tearing of label sheet 3 itself or in tearing the tabs that connect each of the partially cut labels or sets of labels 28 from the scrim area, causing cut labels or sets of labels 28 to be improperly located. Thus, vacuum conveyor 25 is permitted to move while circumferential die cutter 17 is stopped. Label sheet 3 may also be moved backward by pinch rolls 15, 16 in order to re-register label sheet 3 prior to the next label cutting cycle performed by circumferential die cutter 17.

One or more scrim hold down assemblies 29 may be provided along vacuum conveyor 25 above label sheet 3. Scrim hold down assemblies 29 are arranged to be vertically moveable, in response to compressed gas or some other conventional actuation force, between an up position and a down position. When in the up position, scrim hold down assemblies 29 are raised a sufficient distance above label sheet 3 to permit label sheet 3 to be freely longitudinally conveyed on vacuum conveyor 25. When in the down position, scrim hold down assemblies 29 are lowered such that leading and trailing transverse bars 32, 33 thereof contact the scrim areas of label sheet 3 between longitudinally-adjacent ones of labels or sets of labels 28 to permit the completely or partially cut labels or sets of labels 28 to be removed, either singly or in groups, by an external conventional pick and place head 27, without disturbing the scrim areas. External pick and place head 27 is actuated by vacuum or some other conventional method to lift one or more of the labels or sets of labels 28 from label sheet 3 and to place them in position for further processing, such as on mandrels within an injection mold, for example.

A plurality of vacuum plenums 26, illustrated in the cut-away portion of FIG. 5, are provided along vacuum conveyor 25 to selectively apply hold-down vacuum from an external source to vacuum conveyor 25. The vacuum so applied serves to maintain label sheet 3 in a position of registration, fixed with respect to vacuum conveyor 25, while label sheet 3 is being conveyed thereon. When the label sheet 3 has been conveyed to a predetermined label removal position, vacuum previously applied to vacuum plenums 26 is released, and the cut labels or sets of labels 28 are free to be removed by pick and place head 27. An optical sensor 23, located adjacent to vacuum conveyor 25, detects each of the registration marks 24 on label sheet 3 to facilitate alignment of the cut labels or sets of labels 28 in the position of registration, which is a predetermined longitudinal position obtained through precise control of the servo driven vacuum conveyor 25. In order to locate label sheet 3 in either its position of registration or its label removal position on vacuum conveyor 25 more precisely, servo motor 30 may be controlled to restart movement of vacuum conveyor 25 at a lower speed.

Following removal of the cut labels 28 by pick and place head 27, the scrim hold down assemblies 29 are actuated to the up position, and the scrim 31 is conveyed off the end of the vacuum conveyor 25 during the next cycle of operation.

Figure 6:
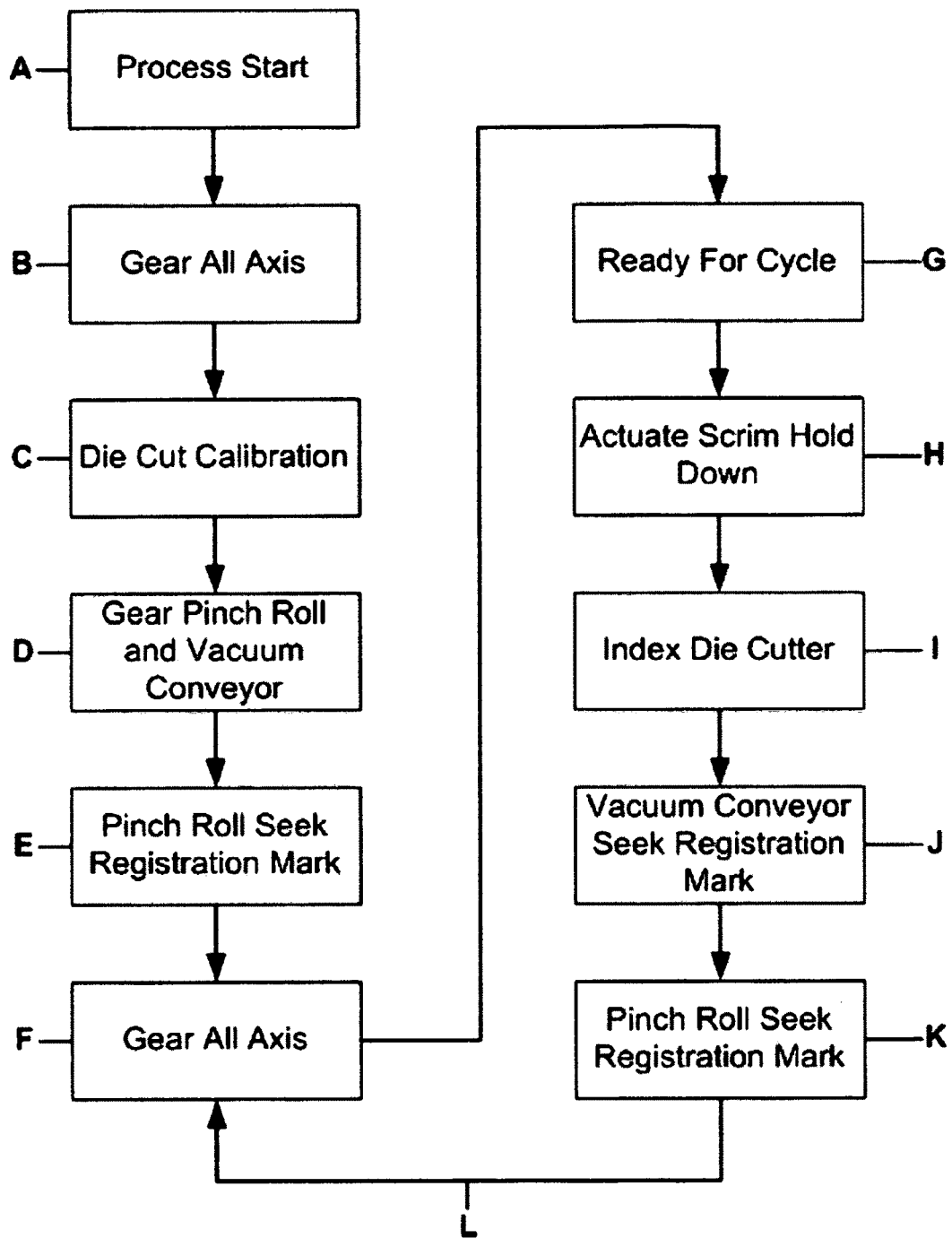
FIG. 6 is a flow chart of the steps performed by a conventional electronic processor to control the in-mold labeling apparatus of FIGS. 1 and 2.

Operation of the in-mold labeling apparatus 100 of FIGS. 1-5 may be further understood with reference to the flow chart of electronic control steps illustrated in FIG. 6, which may be implemented in and executed by a conventional electronic controller.

A Process Start command is issued at control step A. A Gear All Axis command is issued at control step B to electronically synchronize the servo motors 14, 18, 30 such that servo motor 14 functions as the master and servo motors 18, 30 function as slaves. An additional command is issued at control step B to move scrim hold down assemblies 29 to the up position. A Die Cut Calibration command is issued at control step C to cause servo motor 18 to rotate in the forward direction until one of the calibration sensors 19 has detected a calibration position of circumferential die cutter 17, following which servo motor 18 is commanded to stop rotating. A Gear Pitch Roll and Vacuum Conveyor command is then issued at control step D to electronically synchronize the servo motors 14, 30 such that servo motor 14 functions as the master and servo motor 30 functions as a slave. A Pinch Roll Seek Registration Mark command is then issued at control step E to cause master servo motor 14 to rotate in the forward direction until sensor 13 has detected registration mark 24 to thereby verify the longitudinal position of label sheet 3, following which servo motor 14 is commanded to stop rotating. A Gear All Axis command is then issued at control step F to electronically synchronize the servo motors 14, 18, 30 such that servo motor 18 functions as the master and servo motor 14, 30 function as slaves. An additional command is issued at Control step F to move the scrim hold down assemblies 29 to the down position. A Ready for Cycle command is then issued at control step G to maintain the in-mold labeling apparatus 100 in a ready state. An Actuate Scrim Hold Down command is then issued at control step H to move the scrim hold down assemblies 29 to the up position. An Index Die Cutter command is then issued at control step I to cause servo motor 18 to rotate in the forward direction until sensor 19 has detected the calibration position of circumferential die cutter 17, following which servo motor 18 is commanded to stop rotating. At the same time, servo motors 14, follow the command velocity of servo motor 18. Servo motors 14, 18, 30 are commanded to electronically decouple from each other. A Vacuum Conveyor Seek Registration Mark is then issued at control step J to electronically synchronize the servo motors 14, 30 such that servo motor 14 functions as the master and servo motor 30 functions as a slave. Servo motor 14 is commanded to rotate in the forward direction until sensor 23 has detected registration mark 24 to thereby verify the longitudinal position of label sheet 3, following which servo motor 30 is commanded to stop rotating. Servo motors 14, 18, 30 are then commanded to electronically decouple from each other. A Pinch Roll Seek Registration Mark command is then issued at control step K to electronically synchronize the servo motors 14, 30 such that servo motor 14 functions as the master and servo motor 30 functions as a slave. Servo motor 14 is commanded to rotate in the reverse direction until sensor 13 has detected registration mark 24 to thereby verify the longitudinal position of label sheet 3, following which servo motor 14 is commanded to stop rotating. This step allows the passive roll 21 to take up any slack in the label sheet 3. Following execution of control step K, electronic control of the in-mold labeling apparatus is directed to control step F.

We claim:

1. Apparatus for use in an in-mold labeling process, comprising:
   a servo-driven label stock roll comprising a continuous rolled label sheet having a multiplicity of non-adhesive labels pre-printed thereon and having a registration mark associated with each of said labels also pre-printed thereon;
   an active float roll for receiving a free end of said label sheet unwound from said label stock roll, said first active float roll being operative for maintaining a constant tension in said label sheet as it is being unwound from said label stock roll and for providing feedback for controlling the rate at said label sheet is unwound from said label stock roll;
   a plurality of idler rolls positioned downstream from said active float roll for defining a path of said label sheet as it is being unwound from said label stock roll;
   a first sensor positioned in the path of said label sheet for detecting a distinguishing feature on said label sheet to thereby enable lateral justification thereof;
   a second sensor positioned in the path of said label sheet for detecting each of said registration marks pre-printed on said label sheet to enable alignment of said label sheet in a predetermined longitudinal position of registration with respect to said second sensor;
   a set of servo-driven pinch rolls positioned in the path of said label sheet for clamping the free end of said label sheet therebetween and for moving said label sheet in a selected direction;
   a servo-driven circumferential die cutter positioned to receive the free end of said label sheet from said pinch rolls, said die cutter being operative for cutting one or more of said labels from said label sheet;
   a passive float roll positioned downstream from said die cutter for receiving the free end of said label sheet thereunder, said passive float roll being subjected to a downward force sufficient to create a controlled loop in said label sheet for maintaining a desired tension therein as it exits said die cutter;
   a servo-driven vacuum conveyor positioned horizontally to receive said label sheet from said passive float roll for conveyance along said vacuum conveyor, said controlled loop in said label sheet permitting operation of said vacuum conveyor independently of said die cutter;
   a third sensor positioned adjacent to said vacuum conveyor, said third sensor being operative for detecting each of said registration marks pre-printed on said label sheet for enabling alignment of said label sheet in a predetermined longitudinal position of registration on said vacuum conveyor with respect to said third sensor; and
   a plurality of vacuum plenums provided along said vacuum conveyor, a hold-down vacuum being selectively applied to said vacuum plenums from an external source for maintaining said label sheet in said position of registration on said vacuum conveyor during conveyance thereof to a predetermined label removal position, said hold-down vacuum then being released to permit removal, by an external pick and place device, of one or more of said labels previously cut by said die cutter.

2. Apparatus as in claim 1, wherein:
   said first sensor is positioned downstream from said active float roll;
   said second sensor is positioned downstream from said first sensor; and
   said set of servo-driven pinch rolls is positioned downstream from said second sensor.

3. Apparatus as in claim 1, wherein said first and second sensors comprise optical sensors.

4. Apparatus as in claim 1, further comprising a third sensor positioned in the path of said label sheet for detecting the presence of a splice in said label sheet.

5. Apparatus as in claim 4, wherein said third sensor comprises an optical sensor.

6. Apparatus as in claim 1, wherein one or more of said labels comprises one or more series of labels.

7. Apparatus as in claim 1, further comprising an additional passive float roll positioned downstream from said first sensor for maintaining a constant tension in said label sheet.

8. Apparatus as in claim 1, further comprising one or more scrim hold down assemblies positioned along said vacuum conveyor above said label sheet, each of said scrim hold down assemblies being vertically movable between an up position in which it is raised a sufficient distance above said label sheet to permit said label sheet to be freely longitudinally conveyed on said vacuum conveyor and a down position in which it contacts a scrim area of said label sheet to permit removal of one or more of said labels previously cut by said die cutter.

9. Apparatus as in claim 8, wherein each of said scrim hold down assemblies comprises leading and trailing transverse bars that contact said scrim area of said label sheet when each of said scrim hold assemblies is in said down position.

10. Apparatus as in claim 1, wherein said die cutter is operative for partially cutting one or more of said labels from said label sheet and for leaving a plurality of uncut tabs joining points along a peripheral edge of each cut label to a scrim or waste area of said label sheet.

11. Apparatus as in claim 1, wherein said multiplicity of labels pre-printed on said label sheet are arranged in a plurality of longitudinal lanes across a width of said label sheet.

12. Apparatus for use in an in-mold labeling process, comprising:
  a label cutter positioned to receive the free end of a rolled label sheet having a multiplicity of labels pre-printed thereon, said label cutter being operative for cutting one or more of said labels from said label sheet following alignment of said label sheet in a predetermined position of registration to said label cutter;
  a vacuum conveyor positioned horizontally to receive said label sheet from said label cutter for conveyance along said vacuum conveyor to a predetermined label removal position at which movement of said vacuum conveyor is halted;
  a passive float roll positioned between said label cutter and an input end of said vacuum conveyor, said label sheet being routed under said float roll before entering said input end of said vacuum conveyor, said float roll being subjected to a downward force sufficient to create a controlled loop in said label sheet for maintaining a desired tension therein as it exits said label cutter and for permitting operation of said vacuum conveyor independently of said label cutter;
  means associated with said vacuum conveyor for aligning said label sheet in a predetermined longitudinal position of registration on said vacuum conveyor; and
  a plurality of vacuum plenums provided along said vacuum conveyor, a hold-down vacuum being selectively applied to said vacuum plenums from an external source for maintaining said label sheet in said position of registration on said vacuum conveyor during conveyance thereof to a predetermined label removal position, said hold-down vacuum then being released to permit removal, by an external pick and place device, of one or more of said labels previously cut by said label cutter.

13. Apparatus for use in an in-mold labeling process as in claim 12, wherein said label cutter comprises a circumferential die cutter.

14. Apparatus as in claim 12, further comprising one or more scrim hold down assemblies positioned along said vacuum conveyor above said label sheet, each of said scrim hold down assemblies being vertically movable between an up position in which it is raised a sufficient distance above said label sheet to permit said label sheet to be freely longitudinally conveyed on said vacuum conveyor and a down position in which it contacts a scrim area of said label sheet to permit removal of said one or more of said labels previously cut by said die cutter.

* * * * *